(12) United States Patent  (10) Patent No.: US 8,289,317 B2
Harvill  (45) Date of Patent: *Oct. 16, 2012

(54) AUTOMATIC 3D MODELING

(75) Inventor: Young Harvill, San Mateo, CA (US)

(73) Assignee: Laastra Telecom GmbH LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,564

(22) Filed: Dec. 7, 2011

(65) Prior Publication Data
US 2012/0075298 A1  Mar. 29, 2012

Related U.S. Application Data

(63) Continuation of application No. 13/093,377, filed on Apr. 25, 2011, now Pat. No. 8,094,150, which is a continuation of application No. 12/099,098, filed on Apr. 7, 2008, now Pat. No. 7,952,577, which is a continuation of application No. 11/354,511, filed on Feb. 14, 2006, now Pat. No. 7,355,607, which is a continuation of application No. 10/219,041, filed on Aug. 13, 2002, now Pat. No. 7,123,263.

(60) Provisional application No. 60/312,384, filed on Aug. 14, 2001.

(51) Int. Cl.
G06T 17/05 (2006.01)
(52) U.S. Cl. .................................... 345/419; 345/582
(58) Field of Classification Search .................. 345/419, 345/582
See application file for complete search history.

(56) References Cited

U.S. PATENT DOCUMENTS

| 5,696,892 | A | 12/1997 | Redmann et al. |
|---|---|---|---|
| 5,870,138 | A | 2/1999 | Smith et al. |
| 5,969,722 | A | 10/1999 | Palm |
| 6,072,496 | A | 6/2000 | Guenter et al. |
| 6,208,357 | B1 | 3/2001 | Koga et al. |
| 6,222,553 | B1 | 4/2001 | DeRose et al. |
| 6,285,380 | B1 | 9/2001 | Perlin et al. |
| 6,384,829 | B1 | 5/2002 | Prevost et al. |
| 6,483,513 | B1 | 11/2002 | Haratsch et al. |
| 6,492,986 | B1 | 12/2002 | Metaxas et al. |
| 6,552,729 | B1 | 4/2003 | DiBernardo et al. |
| 6,853,373 | B2 | 2/2005 | Williams et al. |
| 7,123,263 | B2 * | 10/2006 | Harvill .......................... 345/473 |

(Continued)

FOREIGN PATENT DOCUMENTS
EP  0593028  4/1994
(Continued)

OTHER PUBLICATIONS

A comparative study on the sign language communication systems between Korea and Japan through 20 and 3D character models on the Internet; Sang-Woon Kim et al.: Image Processing, 1999. ICIP 99. Proceedings. 1999 International C (p. 227-231).

(Continued)

Primary Examiner — Javid A Amini

(57) ABSTRACT

An automatic 3D modeling system and method are described in which a 3D model may be generated from a picture or another image. For example, a 3D model for a face of a person may be automatically generated. The system and method also permits gestures/behaviors associated with a 3D model to automatically generated so that the gestures/behaviors may be applied to any 3D models.

18 Claims, 25 Drawing Sheets

U.S. PATENT DOCUMENTS

| | | | |
|---|---|---|---|
| 7,205,999 B2 | 4/2007 | Leather | |
| 7,355,607 B2* | 4/2008 | Harvill | 345/619 |
| 7,952,577 B2* | 5/2011 | Harvill | 345/420 |
| 8,094,150 B2* | 1/2012 | Harvill | 345/419 |
| 2002/0122038 A1 | 9/2002 | Cowperthwaite | |
| 2002/0180760 A1 | 12/2002 | Rubbert et al. | |
| 2003/0117392 A1* | 6/2003 | Harvill | 345/419 |
| 2006/0132502 A1* | 6/2006 | Harvill | 345/619 |
| 2006/0195787 A1 | 8/2006 | Topiwala et al. | |

FOREIGN PATENT DOCUMENTS

| | | |
|---|---|---|
| EP | 1049047 | 11/2000 |

OTHER PUBLICATIONS

Animated Deformations with Radia Basis Functions; Ulrich Neumann, Jun-yong Noh, Douglas Fidaleo Oct. 2000 pp. 166-174. Proceeding of the ACM symposium.

A Morphable Model for the Synthesis of 3D Faces; Volker Blanz, Thomas Vetter, pp. 187-194; Jul. 1999 Proceedings of the 26th annual conference on computer graphics and interactive techniques.

Model-Based Motion Estimation for Synthetic Animations; Maneesh Agrawala et al. Nov. 1995 ACM Multimedia 95—Electronic Proceedings.

"The Emote Model for Effort and Shape," International Conference on Computer Graphics and Interactive Techniques; Proceedings of the 27th annual conference on Computer graphics and interactive techniques; Chi et al.; pp. 173-182, Pub. 2000 ISBN:1-58113-208-5.

Animated Conversation: rule-based generalion of facial expression, gesture and spoken intonation for multiple conversational agents; Justine Cassell et al. pp. 413-420; Pub. 1994; ISBN-0-89791-667-0.

PCT Written Opinion dated Oct. 17, 2003 corresponding to PCT US02/25933; pp. 1-6.

PCT International Search Report dated Dec. 17, 2002 corresponding to PCT US02125933; pp. 1-4.

Supplementary European Search Report dated Sep. 22, 2005 issued by the European Patent Office for European Patent Application SIN 00942714.7-221811 PCT US 00 15817; mailing date Sep. 29,2005; pp. 1-3.

Committee Draft: "Information technology—coding of audio-visual objects: visualISOIIEC 14496-2" Nov. 21, 1997, International Organization for Standardisation ISOIIEC JTC1/SC29IWG11 N1902, Fribourg, XP002345236 (p. 1-298 with index i-xii).

Alexandros Eleftheriadis, Carsten Herpel, Ganesh Rajan, and L1AM Ward: "MPEG-4 Systems 14496-1" Nov. 21, 1997, International Organisation for Standardisation ISOIIEC JTC1/SC29IWG11 N1901 XP002345231 (p. 1-206 with index i-xv).

Ostermann J: "Animation of synthetic faces in MPEG-4" Computer Animation 98. Proceedings Philadelphia, PA, USA Jun. 8-10, 1998, Los Alamitos, CA, USA, IEEE Comput. Soc, US, Jun. 8, 1998, pp. 49-55, XP010285085 ISBN: 0-8186-8541-7 section 2, pp. 49-52.

Doenges P K et al: "AudioNideo and synthetic graphicslaudio for mixed media" Signal Processing. Image Communication, Elsevier Science Publishers, Amsterdam, NL, vol. 9, No. 4, May 1997, pp. 433-463, XP004075338 ISSN: 0923-5965 sections 2.4,2.4.1 and in general section 5.

[MPEG-4 Overview—(Dublin version) International Organization for Standardization-Organisation Internationale DE Normalisation, No. ISOIIEC JTC11SC, Jul. 1998,55 pages, XP0021200 14.

Tang, L1-AN, et al., "Automatic Constructionof 3D Human Face Models Based on 2D Images", Proceedings., International Conference on Image Processing, 1996. Publication Date: Sep. 16-19, 1996 vol. 3, pp. 467-470.

* cited by examiner

FIG. 12A

Head bounds are found by integrating opaque alpha pixels out from a likely location for the head.

Eyes are found by looking for a highlight surrounded by a dark area of a predetermined size, within likely areas in head bounds.

Pseudo Code for possible outer loop of constructing a Virtual Personality with Veepers

```
tolerance FindLandMarks (Photo, LandMarks, Orientation, weightThreshold)
{
    SamplePoints
    AverageCenterofHead
    HeadBoundRange
    HeadBounds ClearAlphaChannel(Photo)
    InitAverageCenterofHead(Orientation, AverageCenterofHead);
    initSamplePoints(Orientation, SamplePoints);
    InitValidHeadBoundRange(Orientation, HeadBoundRange)
    SeedFillAlpha(Photo, Orientation, SamplePoints);
    HeadBounds = IntegrateHeadBoundsFromAlpha(Photo, Orientation, AverageCenterofHead);
    weight = CalcHeadBoundWeight(Orientation, HeadBoundRange);
    if (weight > weightThreshold)
    {
        LandMarks.eyes = FindEyes(Photo, Orientation, HeadBounds);
        weight *= CalCEyeTolerance(HeadBounds, LandMarks.eyes);
        if (weight > weightThreshold)
        {
            ...HereWe continue to find other landmarks.
        }
    }
    return(tolerance);
}

Photo MakeVeeper (theFile)
{
    Photo originalPhoto = LoadRasterFile(theFile);
    Photo texturePhoto = ResampleToPowerofTwo(originalPhoto);
    LandMarks theLandmarks;
    Orientation bestOrient;
    weight bestTolerance;
    VeeperModel theModel CreateOrientAlphas(texturePhoto);
    toleranceTop = FindLandMarks(texturePhoto, theLandmarks, Up_Top, VALID_LANDMARK)
    toleranceRight = FindLandMarks(texturePhoto, theLandmarks, Up_Right, VALID_LANDMARK)
    toleranceLeft = FindLandMarks(texturePhoto, theLandmarks, Up_Left, VALID_LANDMARK)
    toleranceBottom = FindLandMarks(texturePhoto, theLandmarks, Up_Bottom, VALID_LANDMARK)
```

```
bestOrient = Up_Top;
bestTolerance = toleranceTop;
if (bestTolerance < toleranceRight)
{
    bestTolerance = toleranceRight;
    bestOrient = Up_Right
}
if (bestTolerance < toleranceLeft)
{
    bestTolerance = toleranceLeft;
    bestOrient = Up_Left
}
if (bestTolerance < toleranceBottom)
{
    bestTolerance = toleranceBottom;
    bestOrient = Up_Bottom;
}
bestTolerance = FindLandMarks(texturePhoto, the Landmarks, bestOrient, VALID_LANDMARK)
OrientPhoto(texturePhoto, bestOrient);
if (bestTolerance < GOOD_LANDMARK)
{
    GetUILandmarks(texturePhoto, LandMarks);
}
theModel = FindBestFitModel(LandMarks, ModelDataBase)
FitModelBounds(theModel, LandMarks.bounds);
Fit ModelFeature(theModel, LandMarks.feature);
FitModelEdge(theModel, LandMarks.edge);
ScaleModelBehaviorsBySpace(theModel, the Model.feature);
theModel = MakeTurnkeyModel(theModel)
SaveModel(theModel);
}
```

VEEPERS WORK FLOW, END USER

1. USER LOADS THE IMAGE.
2. RESAMPLE OR PAD THE IMAGE TO POWER OF TWO.
3. CREATE ALPHA CHANNEL FOR SEGMENTATION OF BACKGROUND AND CHARACTER.
4. USER SUPPLIES THE FOLLOWING INFORMATION.
    a. NAME
    b. SEX
    c. AGE
    d. WEIGHT
    e. ETHNICITY (OPTIONAL BUT WILL NARROW SEARCH)
    f. HAIR COLOR
    g. LENGTH OF HAIR / HAIR STYLE (SURVEY POPULAR STYLES FOR AGE GROUP/SEX)
        i. MEN
            1. STYLE OF BEARD
                a. CLEAN SHAVEN
                b. SHORT BEARD
                c. GOATEE
                d. MEDIUM LENGTH BEARD
                e. FULL LENGTH BEARD.
                f. ZZ TOP.
            2. VERY SHORT/BUZZ
            3. SHORT
            4. BUSINESS CUT
            5. MEDIUM LENGTH.
            6. LONG
        ii. WOMEN
            1. VERY SHORT.
            2. SHORT
            3. MEDIUM LENGTH
            4. LONG
            5. VERY LONG
    h. GLASSES (NEED TO REMOVE FOR PHOTO AND CHOOSE GLASSES)
    i. JEWELRY/PIERCINGS. (CHOOSE FACIAL ORNAMENTS)
    j. HAT OR HEADGEAR (NEED TO REMOVE FOR PHOTO AND CHOOSE HATS)
5. USER SETS FACIAL LANDMARKS.
    a. CORNER OF EYES.
    b. CORNERS OF NOSE. (WHERE IT MEETS THE CHEEK AND UPPER LIP)
    c. CORNERS OF LIPS. (RIGHT AND LEFT EDGES OF MOUTH)
    d. CENTER OF LIPS.
    e. CENTER OF PUPIL.
    f. SIZE OF IRIS.
    g. RIGHT, LEFT, AND CENTER OF EYEBROWS.
    h. BOTTOM OF CHIN.
    i. TOP OF HEAD.
    j. SIDES OF HEAD IN LINE WITH EYES.

k. TOP, BOTTOM AND CENTER OF EAR. (OPTIONAL)
6. USE FACIAL DATA TO SEARCH FOR AND LOAD A HEAD MODEL THAT BEST FITS.
   a. ALLOW USER TO CHOOSE BETWEEN CLOSE SETS OF IMAGES,
7. USE FACIAL LANDMARKS TO DETERMINE:
   a. ORIENTATION OF HEAD MODEL.
   b. SCALE OF HEAD MODEL.
   c. START POSITION OF POINTS OF THE FEATURE GRID.
8. USER SETS EDGE LANDMARKS.
   a. EDGES OF EYES.
   b. EDGES OF THE MOUTH.
   c. EDGES OF THE NOSE.
   d. EDGES OF THE CHIN.
9. MAP USER PHOTO ON TO HEAD MODEL COORDINATES.
10. USE FEATURE GRID TO SCALE FACIAL BEHAVIORS.
11. DISPLAY RESULT TO USER.
12. SAVE MODEL AS RUNTIME FILES.

```
void AddNeutralFacialGesture(LandmarkPositions position, VeeperModel model)
{
    // update the virtual personality from the new facial landmark positions
    UpdateVeeperFromLandmarkPositions(model, positions);
    // synthesize the background texture to fill in where the virtual personality was
    SynthesisBackgroundTexture(model);

// create a facial gesture that animates vertex positions, texture coordinate positions, and the texture map
    model->baseGesture = MakeNewGesture(model->detail->verts, model->detail->stCoords, model->detail->texture);

// build a scaler field from the scale changes in feature space
    // this allows us to go from a given individual's space to a common space
    model->baseGesture->scalerField = BuildFeatureScalerField(model->baseGesture->verts, model->featureSpace);

// scale the behaviors in common space to the individual's space
    ScaleBehaviors(model->behaviors, model->baseGesture->scalerField);
} facialGesture MakeFacialGesture(LandmarkPositions positions, VeeperModel model, Texture featureMasks)
{
    facialGesture newGesture = null;
    // update the virtual personality from the new facial landmark positions
    UpdateVeeperFrom LandmarkPositions(model, positions);

// make an array of delta changes in texture coordiate space,
    // this is done by correlating a grid of points from the detail texture to the baseGestures Texture
    // grid points are then sampled to determine the delta change for a texture coordinate
    stDeltaChange = PerformFieldCorrelation(model->detail->stCoords, model->baseGesture->texture, model->detail->texture, featureMasks);

// move the texture coordinates back so the two maps will aligned
    ApplySTDeltaChange(model->detail->stCoords, stDeltaChange);

// resample the detail object from the photo to generate a texture aligned in coordinate space.
    UpdateMapFromPhoto(model->detail, model->inputPhoto, model->detail->texture);

// calculate the delta change for the 3d verticies of the detail model
    // use the baseGesture's scalerField to transform the delta into common feature space.
    // additionally, filter the vertDeltaChange by the featureMask, in this way we
    // can filter for only a mouth change, eye change, or facial change.
    vertDeltaChange = MakeVertDeltaChange(model->baseGesture->verts, model->detail->verts, model->baseGesture->scalerField, featureMasks);
```

```
        // calculate the delta change in the texture
        // filter the delta by the featureMask,
        deltaMap = MakeTextureDeltaChange(model->detail->texture,
model->baseGesture-> texture, featureMasks);

// make a gesture object which encodes the changes in vertex position, texture coordinate
position,
        // and texture map changes
        newGesture = MakeNewGesture(vertDeltaChange, stDeltaChange, deltaMap);

return(newGesture);
}

PlayFacialGesture(VeeperModel model, facialGesture theGesture, real time, boolean firstGesture)
{
        // reset the model if this is the first gesture
        if (firstGesture)
        {
            model->detail->verts = model->baseGesture->verts;
        }
        // transform the delta verts into individual feature space using scalerField,
        // scale the delta verts by time,
        // add to the detail verts
        addVertDeltaChange(model->detail->verts, theGesture->verts,
model->baseGesture->scalerField, time);
        // scale the delta change for the stCoords by time,
        // add to the detail stCoords.
        AddSTDeltaChange(model->detail->stCoords, the Gesture->stCoords, time);
        // scale the delta change for the texture by time and add to the detail texture.
        AddTextureChange(model->detail->texture, theGesture->texture, time);
}
```

FIG. 14B

AUTOMATIC 3D MODELING

RELATED APPLICATION

This application is a continuation of U.S. patent application Ser. No. 13/093,377, filed on Apr. 25, 2011 and entitled "Automatic 3D Modeling," which is a continuation of U.S. patent application Ser. No. 12/099,098, filed on April 7, 2008, and entitled "Automatic 3D Modeling," which in turn claims priority under 35 USC §120 from U.S. Utility patent application Ser. No. 11/354,511, filed on Feb. 14, 2006, and entitled "Automatic 3D Modeling System and Method" which in turn claims priority under 35 USC §120 from U.S. Utility patent application Ser. No. 10/219,041, filed on Aug. 13, 2002, and entitled "Automatic 3D Modeling System and Method" which in turn claims priority under 35 USC 119(e) from U.S. Provisional Patent Application Ser. No. 60/312,384 filed on Aug. 14, 2001 and entitled "Automatic 3D Modeling System And Method," all of which are incorporated herein by reference in their entirety.

FIELD OF THE INVENTION

The present invention is related to 3D modeling systems and methods and more particularly, to a system and method that merges automatic image-based model generation techniques with interactive real-time character orientation techniques to provide rapid creation of virtual 3D personalities.

BACKGROUND

There are many different techniques for generating an animation of a three dimensional object on a computer display. Originally, the animated figures (for example, the faces) looked very much like wooden characters, since the animation was not very good. In particular, the user would typically see an animated face, yet its features and expressions would be static. Perhaps the mouth would open and close, and the eyes might blink, but the facial expressions, and the animation in general, resembled a wood puppet. The problem was that these animations were typically created from scratch as drawings, and were not rendered using an underlying 3D model to capture a more realistic appearance, so that the animation looked unrealistic and not very life-like. More recently, the animations have improved so that a skin may cover the bones of the figure to provide a more realistic animated figure.

While such animations are now rendered over one or more deformation grids to capture a more realistic appearance for the animation, often the animations are still rendered by professional companies and redistributed to users. While this results in high-quality animations, it is limited in that the user does not have the capability to customize a particular animation, for example, of him or herself, for use as a virtual personality. With the advance features of the Internet or the World Wide Web, these virtual personas will extend the capabilities and interaction between users. It would thus be desirable to provide a 3D modeling system and method which enables the typical user to rapidly and easily create a 3D model from an image, such as a photograph, that is useful as a virtual personality.

Typical systems also required that, once a model was created by the skilled animator, the same animator was required to animate the various gestures that you might want to provide for the model. For example, the animator would create the animation of a smile, a hand wave or speaking which would then be incorporated into the model to provide the model with the desired gestures. The process to generate the behavior/gesture data is slow and expensive and requires a skilled animator. It is desirable to provide an automatic mechanism for generating gestures and behaviors for models without the assistance of a skilled animator. It is to these ends that the present invention is directed.

SUMMARY

Broadly, the invention utilizes image processing techniques, statistical analysis and 3D geometry deformation to allow photo-realistic 3D models of objects, such as the human face, to be automatically generated from an image (or from multiple images). For example, for the human face, facial proportions and feature details from a photograph (or series of photographs) are identified and used to generate an appropriate 3D model. Image processing and texture mapping techniques also optimize how the photograph(s) is used as detailed, photo-realistic texture for the 3D model.

In accordance with another aspect of the invention, a gesture of the person may be captured and abstracted so that it can be applied to any other model. For example, the animated smile of a particular person may be captured. The smile may then be converted into feature space to provide an abstraction of the gesture. The abstraction of the gesture (e.g., the movements of the different portions of the model) are captured as a gesture. The gesture may then be used for any other model. Thus, in accordance with the invention, the system permits the generation of a gesture model that may be used with other models.

In accordance with the invention, a method for generating a three dimensional model of an object from an image is provided. The method comprises determining the boundary of the object to be modeled and determining the location of one or more landmarks on the object to be modeled. The method further comprises determining the scale and orientation of the object in the image based on the location of the landmarks, aligning the image of the object with the landmarks with a deformation grid, and generating a 3D model of the object based on the mapping of the image of the object to the deformation grid.

In accordance with another aspect of the invention, a computer implemented system for generating a three dimension model of an image is provided. The system comprises a three dimensional model generation module further comprising instructions that receive an image of an object and instructions that automatically generate a three dimensional model of the object. The system further comprises a gesture generation module further comprising instructions for generating a feature space and instructions for generating a gesture object corresponding to a gesture of the object so that the gesture behavior may be applied to another model of an object.

In accordance with yet another aspect of the invention, a method for automatically generating an automatic gesture model is provided. The method comprises receiving an image of an object performing a particular gesture and determining the movements associated with the gesture from the movement of the object to generate a gesture object wherein the gesture object further comprises a coloration change variable storing the change of coloration that occur during the gesture, a two dimensional change variable storing the change of the surface that occur during the gesture and a three dimensional change variable storing the change of the vertices associated with the object during the gesture.

In accordance with yet another aspect of the invention, a gesture object data structure that stores data associated with a gesture for an object is provided. The gesture object comprises a texture change variable storing changes in coloration of a model during a gesture, a texture map change variable storing changes in the surface of the model during the gesture, and a vertices change variable storing changes in the vertices of the model during the gesture wherein the texture change variable, the texture map change variable and the vertices change variable permit the gesture to be applied to another model having a texture and vertices. The gesture object data structure stored its data in a vector space where coloration, surface motion and 3D motion may be used by many individual instances of the model.

BRIEF DESCRIPTION OF THE DRAWINGS

FIGS. 12A and 12B illustrate an exemplary pseudo-code for performing the image processing techniques of the invention;

FIGS. 13A and 13B illustrate an exemplary work flow process for automatically generating a 3D model in accordance with the invention;

FIGS. 14A and 14B illustrate an exemplary pseudo-code for performing the automatic gesture behavior model in accordance with the invention;

DETAILED DESCRIPTION

While the invention has a greater utility, it will be described in the context of generating a 3D model of the human face and gestures associated with the human fact. Those skilled in the art recognize that any other 3D models and gestures can be generated using the principles and techniques described herein, and that the following is merely exemplary of a particular application of the invention and the invention is not limited to the facial models described herein.

Figure 1:
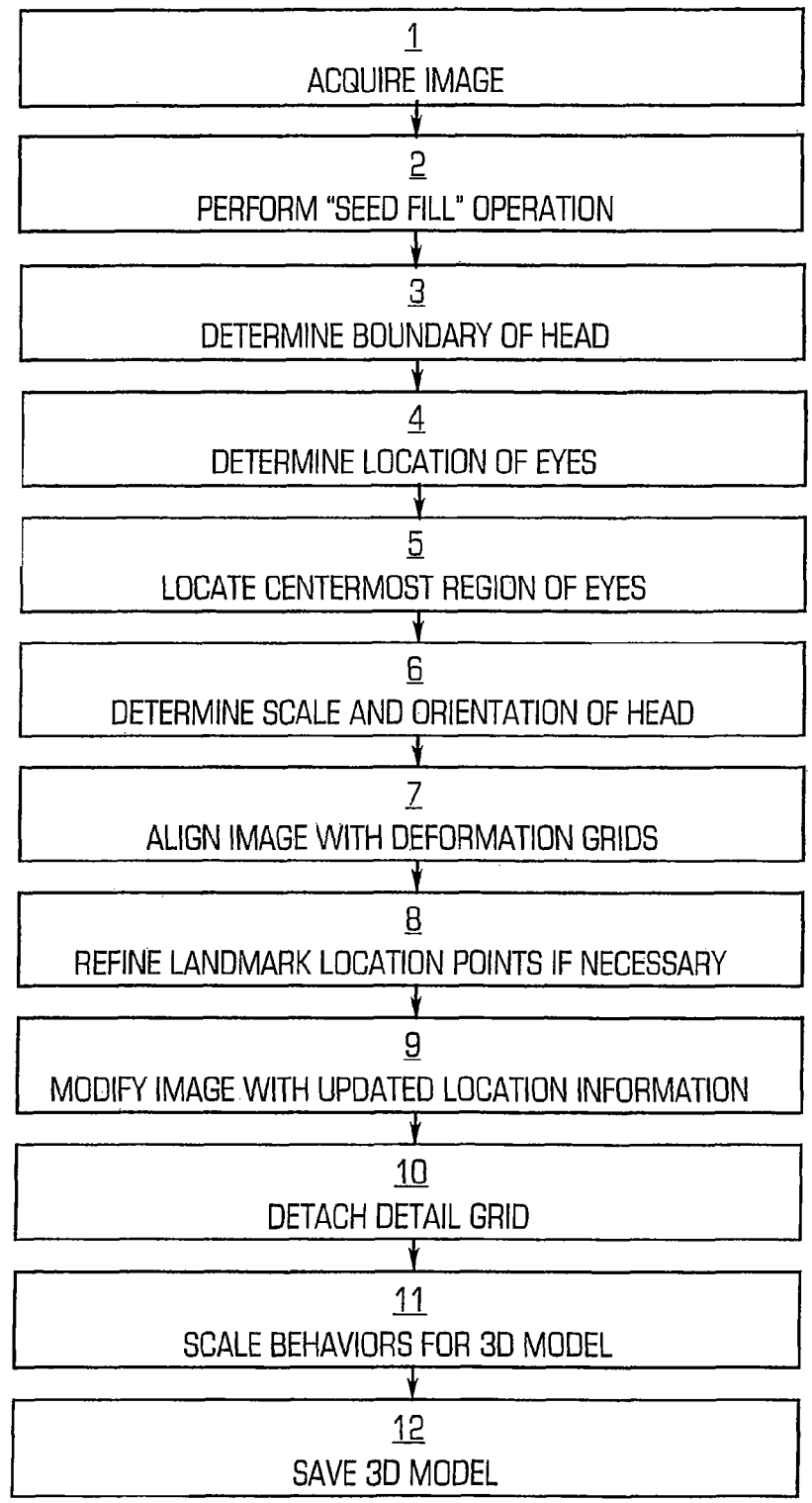
FIG. 1 is a flowchart describing a method for generating a 3D model of a human face.

To generate a 3D model of the human face, the invention performs a series of complex image processing techniques to determine a set of landmark points 10 which serve as guides for generating the 3D model. FIG. 1 is a flow chart describing a preferred algorithm for generating a 3D model of a human face. With reference to FIG. 1, an image acquisition process (Step 1) is used to load a photograph(s) (or other image) of a human face (for example, a "head shot") into the memory of a computer. Images may be loaded as JPEG images, however, other image type formats may be used without departing from the invention. Images can be loaded from a diskette, downloaded from the Internet, or otherwise loaded into memory using known techniques so that the image processing techniques of the invention can be performed on the image in order to generate a 3D model.

Since different images may have different orientations, the proper orientation of the image should be determined by locating and grading appropriate landmark points 10. Determining the image orientation allows a more realistic rendering of the image onto the deformation grids. Locating the appropriate landmark points 10 will now be described in detail.

Figure 4:
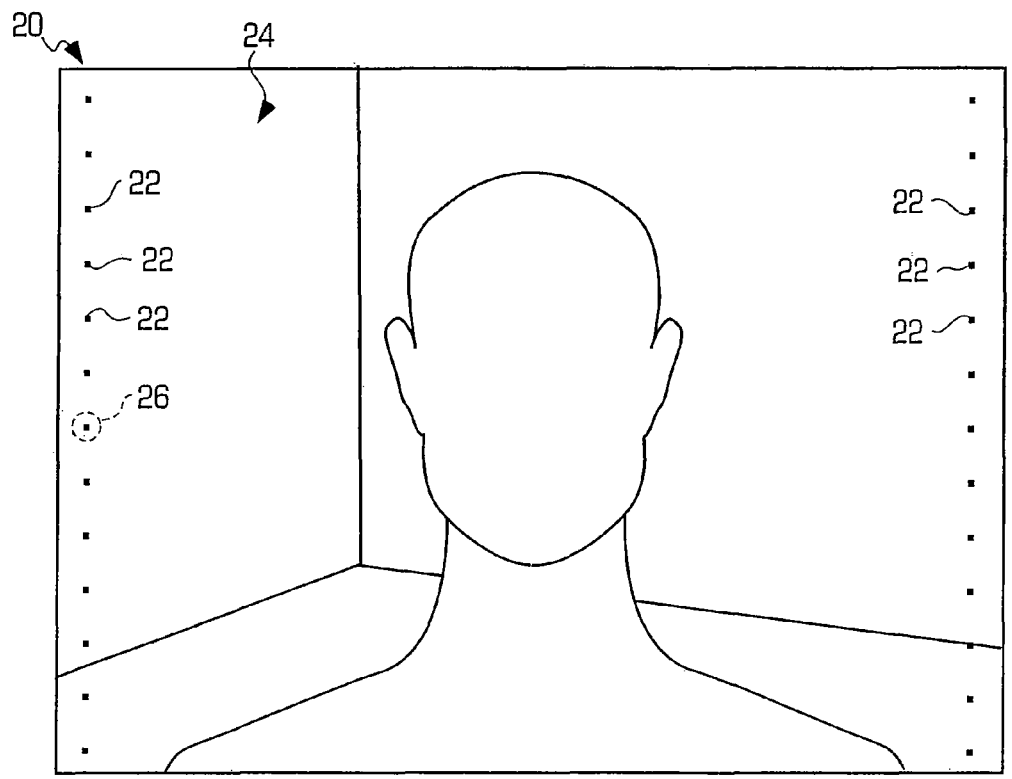
FIG. 4 is an exemplary image of a person's head that may be loaded into the memory of a computer during an image acquisition process.

Referring to FIG. 1, to locate landmark points 10 on an image, a "seed fill" operation may be performed (Step 2) on the image to eliminate the variable background of the image so that the boundary of the head (in the case of a face) can be isolated on the image. FIG. 4 is an exemplary image 20 of a person's head that may be loaded into the memory of the computer during the image acquisition process (Step 1, FIG. 1). A "seed fill" operation (Step 2, FIG. 1) is a well-known recursive paintfill operation that is accomplished by identifying one or more points 22 in the background 24 of the image 20 based on, for example, color and luminosity of the point(s) 22 and expand a paintfill zone 26 outwardly from the point(s) 22 where the color and luminosity are similar. The "seed fill" operation successfully replaces the color and luminescent background 24 of the image with an opaque background so that, the boundary of the head can be more easily determined.

Figure 5:
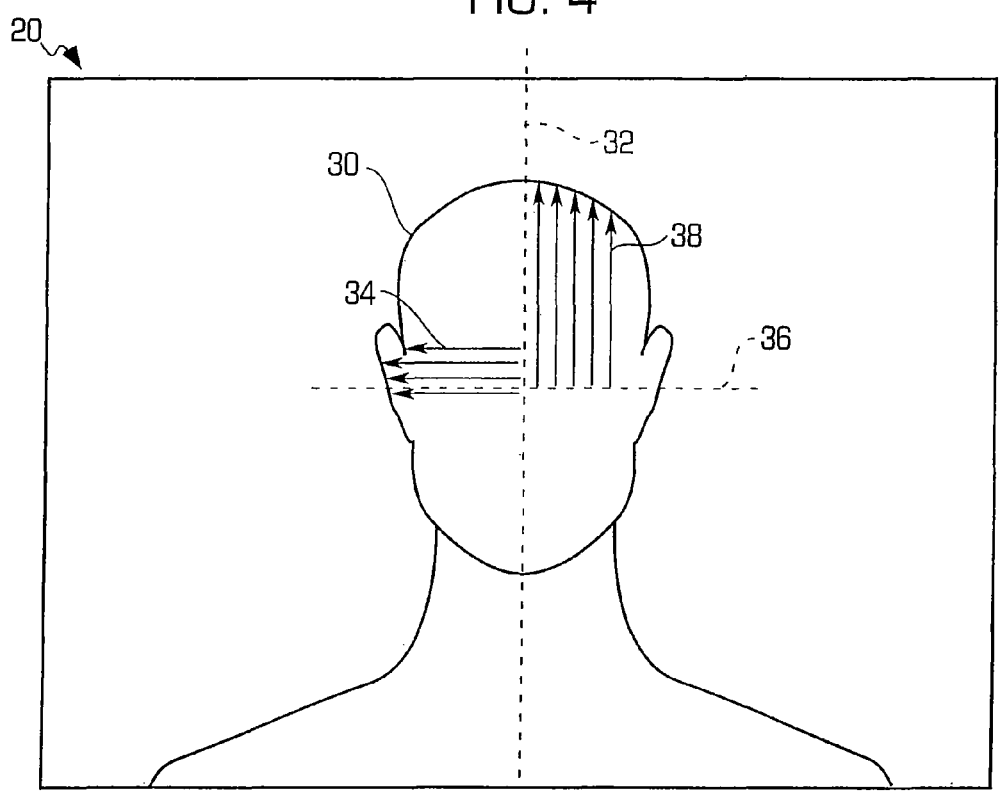
FIG. 5 illustrates the exemplary image of FIG. 4 with an opaque background after having processed the image with a "seed fill" operation.

Referring again to FIG. 1, the boundary of the head 30 can be determined (Step 3), for example, by locating the vertical center of the image (line 32) and integrating across a horizontal area 34 from the centerline 32 (using a non-fill operation) to determine the width of the head 30, and by locating the horizontal center of the image (line 36) and integrating across a vertical area 38 from the centerline 36 (using a non-fill operation) to determine the height of the head 30. In other words, statistically directed linear integration of a field of pixels whose values differ based on the presence of an object or the presence of a background is performed. This is shown in FIG. 5 which shows the exemplary image 20 of FIG. 4 with an opaque background 24.

Returning again to FIG. 1, upon determining the width and height of the head 30, the bounds of the head 30 can be determined by using statistical properties of the height of the head 30 and the known properties of the integrated horizontal area 34 and top of the head 30. Typically, the height of the head will be approximately ⅔ of the image height and the width of the head will be approximately ⅓ of the image width. The height of the head may also be 1.5 times the width of the head which is used as a first approximation.

Figure 6:
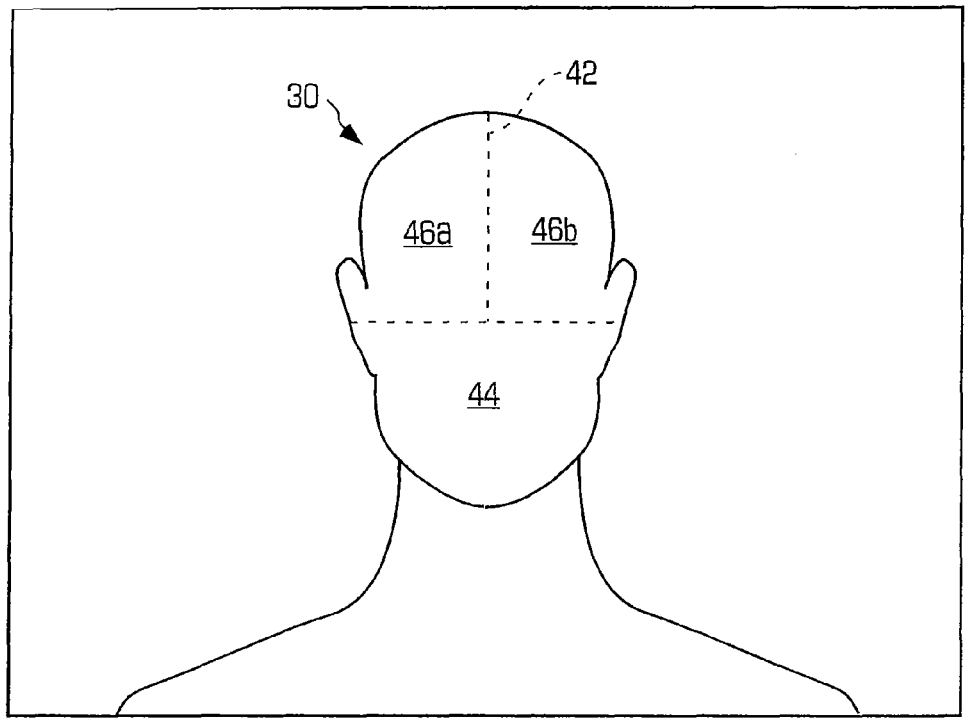
FIG. 6 illustrates the exemplary image of FIG. 5 having dashed lines indicating particular bound areas about the locations of the eyes.

Once the bounds of the head 30 are determined, the location of the eyes 40 can be determined (Step 4). Since the eyes 40 are typically located on the upper half of the head 30, a statistical calculation can be used and the head bounds can be divided into an upper half 42 and a lower half 44 to isolate the eye bound areas 46a, 46b. The upper half of the head bounds 42 can be further divided into right and left portions 46a, 46b to isolate the left and right eyes 40a, 40b, respectively. This is shown in detail in FIG. 6 which shows the exemplary image 20 of FIG. 4 with dashed lines indicating the particular bound areas.

Figure 7:
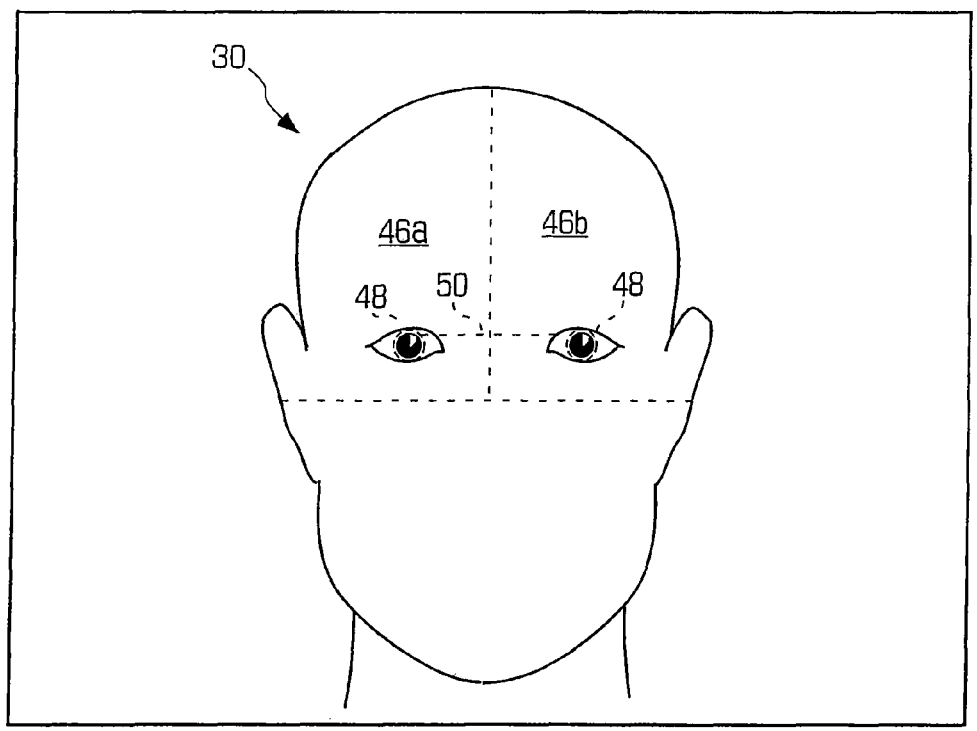
FIG. 7 illustrates the exemplary image of FIG. 6 with the high contrast luminance portion of the eyes identified by dashed lines.

Referring yet again to FIG. 1, the centermost region of each eye 40a, 40b can be located (Step 5) by identifying a circular region 48 of high contrast luminance within the respective eye bounds 46a, 46b. This operation can be recursively performed outwardly from the centermost point 48 over the bounded area 46a, 46b and the results can be graded to determine the proper bounds of the eyes 40a, 40b. FIG. 7 shows the exemplary image of FIG. 6 with the high contrast luminance portion of the eyes identified by dashed lines.

Referring again to FIG. 1, once the eyes 40a, 40b have been identified, the scale and orientation of the head 30 can be determined (Step 6) by analyzing a line 50 connecting the eyes 40a, 40b to determine the angular offset of the line 50 from a horizontal axis of the screen. The scale of the head 30 can be derived from the width of the bounds according to the following formula: width of bound/width of model.

Figure 8:
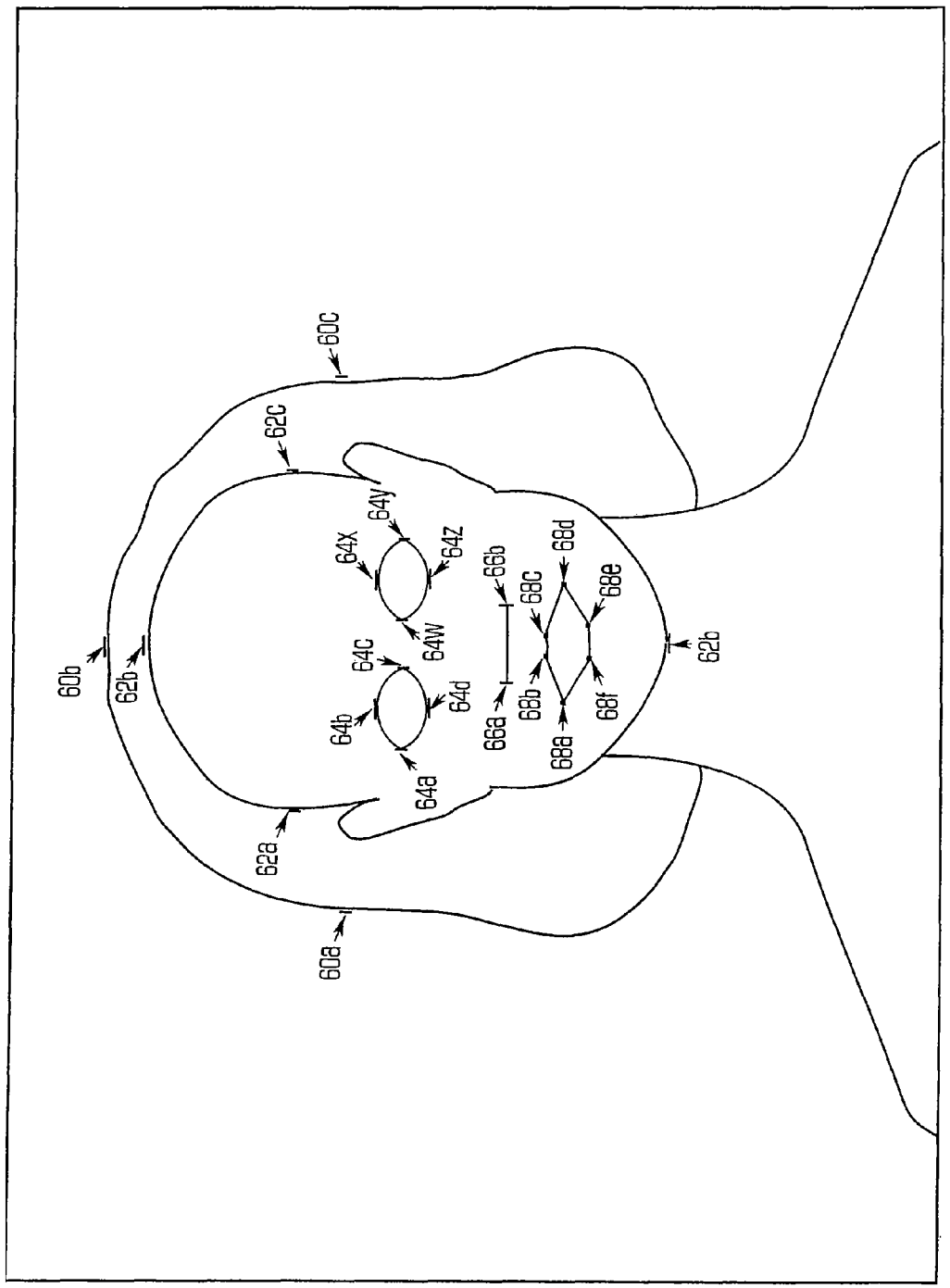
FIG. 8 is an exemplary diagram illustrating various landmark location points for a human head.

After determining the above information, the approximate landmark points 10 on the head 30 can be properly identified. Preferred landmark points 10 include a) outer head bounds 60a, 60b, 60c; b) inner head bounds 62a, 62b, 62c, 62d; c) right and left eye bounds 64a-d, 64w-z, respectively; d) corners of nose 66a, 66b; and e) corners of mouth 68a, 68b (mouth line), however, those skilled in the art recognize that other landmark points may be used without departing from the invention. FIG. 8 is an exemplary representation of the above landmark points shown for the image of FIG. 4.

Figure 9:
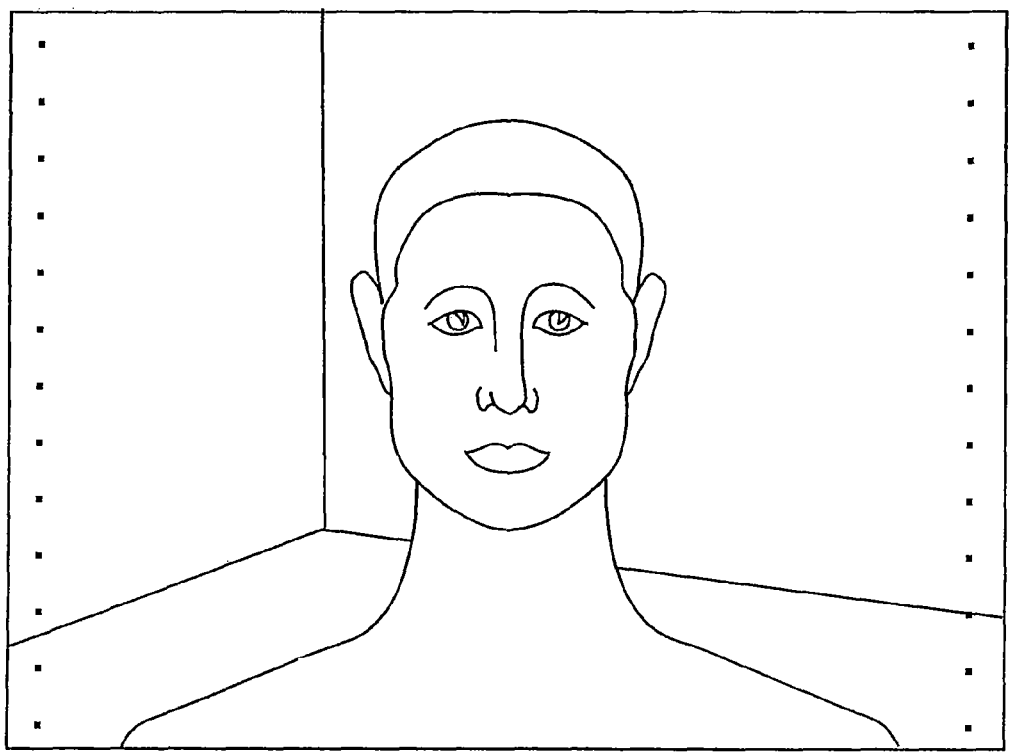
FIG. 9 illustrates an example of a human face 3D model in accordance with the invention.

Having determined the appropriate landmark locations 10 on the head 30, the image can be properly aligned with one or more deformation grids (described below) that define the 3D model 70 of the head (Step 7). The following describes some of the deformation grids that may be used to define the 3D model 70, however, those skilled in the art recognize that these are merely exemplary of certain deformation grids that may be used to define the 3D model and that other deformation grids may be used without departing from the invention. FIG. 9 illustrates an example of a 3D model of a human face generated using the 3D model generation method in accordance with the invention. Now, more details of the 3D model generation system will be described.

Figure 2:
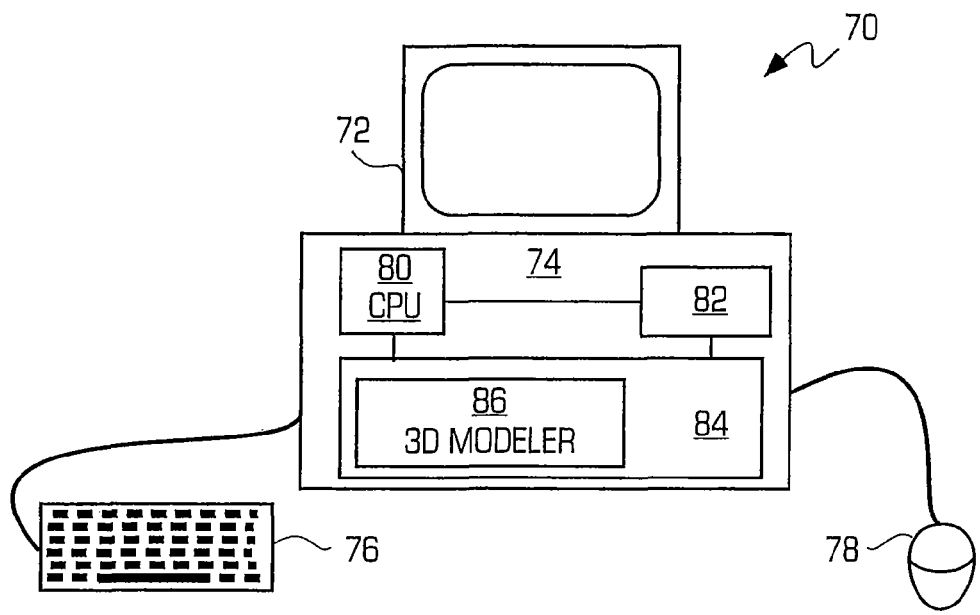
FIG. 2 is a diagram illustrating an example of a computer system which may be used to implement the 3D modeling method in accordance with the invention.

FIG. 2 illustrates an example of a computer system 70 in which the 3D model generation method and gesture model generation method may be implemented. In particular, the 3D model generation method and gesture model generation method may be implemented as one or more pieces of software code (or compiled software code) which are executed by a computer system. The methods in accordance with the invention may also be implemented on a hardware device in which the method in accordance with the invention are programmed into a hardware device. Returning to FIG. 2, the computer system 70 shown is a personal computer system. The invention, however, may be implemented on a variety of different computer systems, such as client/server systems, server systems, workstations, etc. . . . and the invention is not limited to implementation on any particular computer system. The illustrated computer system may include a display device 72, such as a cathode ray tube or LCD, a chassis 74 and one or more input/output devices, such as a keyboard 76 and a mouse 78 as shown, which permit the user to interact with the computer system. For example, the user may enter data or commands into the computer system using the keyboard or mouse and may receive output data from the computer system using the display device (visual data) or a printer (not shown), etc. The chassis 74 may house the computing resources of the computer system and may include one or more central processing units (CPU) 80 which control the operation of the computer system as is well known, a persistent storage device 82, such as a hard disk drive, an optical disk drive, a tape drive and the like, that stores the data and instructions executed by the CPU even when the computer system is not supplied with power and a memory 84, such as DRAM, which temporarily stores data and instructions currently being executed by the CPU and loses its data when the computer system is not being powered as is well known. To implement the 3D model generation and gesture generation methods in accordance with the invention, the memory may store a 3D modeler 86 which is a series of instructions and data being executed by the CPU 80 to implement the 3D model and gesture generation methods described above. Now, more details of the 3D modeler will be described.

Figure 3:
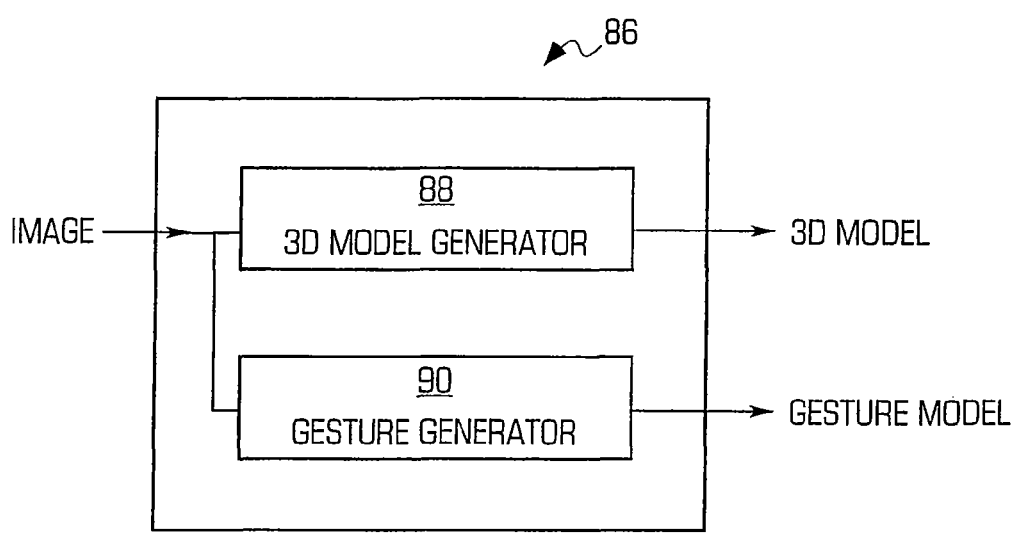
FIG. 3 is a block diagram illustrating more details of the 3D model generation system in accordance with the invention.

FIG. 3 is a diagram illustrating more details of the 3D modeler 86 shown in FIG. 2. In particular, the 3D modeler includes a 3D model generation module 88 and a gesture generator module 90 which are each implemented using one or more computer program instructions. The pseudo-code that may be used to implement each of these modules is shown in FIGS. 12A-12B and FIGS. 14A and 14B. As shown in FIG. 3, an image of an object, such as a human face is input into the system as shown. The image is fed into the 3D model generation module as well as the gesture generation module as shown. The output from the 3D model generation module is a 3D model of the image which has been automatically generated as described above. The output from the gesture generation module is one or more gesture models which may then be applied to and used for any 3D model including any model generate by the 3D model generation module. The gesture generator is described in more detail below with reference to FIG. 11. In this manner, the system permits 3D models of any object to be rapidly generated and implemented. Furthermore, the gesture generator permits one or more gesture models, such as a smile gesture, a hand wave, etc. . . . ) to be automatically generated from a particular image. The advantage of the gesture generator is that the gesture models may then be applied to any 3D model. The gesture generator also eliminates the need for a skilled animator to implement a gesture. Now, the deformation grids for the 3D model generation will be described.

Figure 10A:
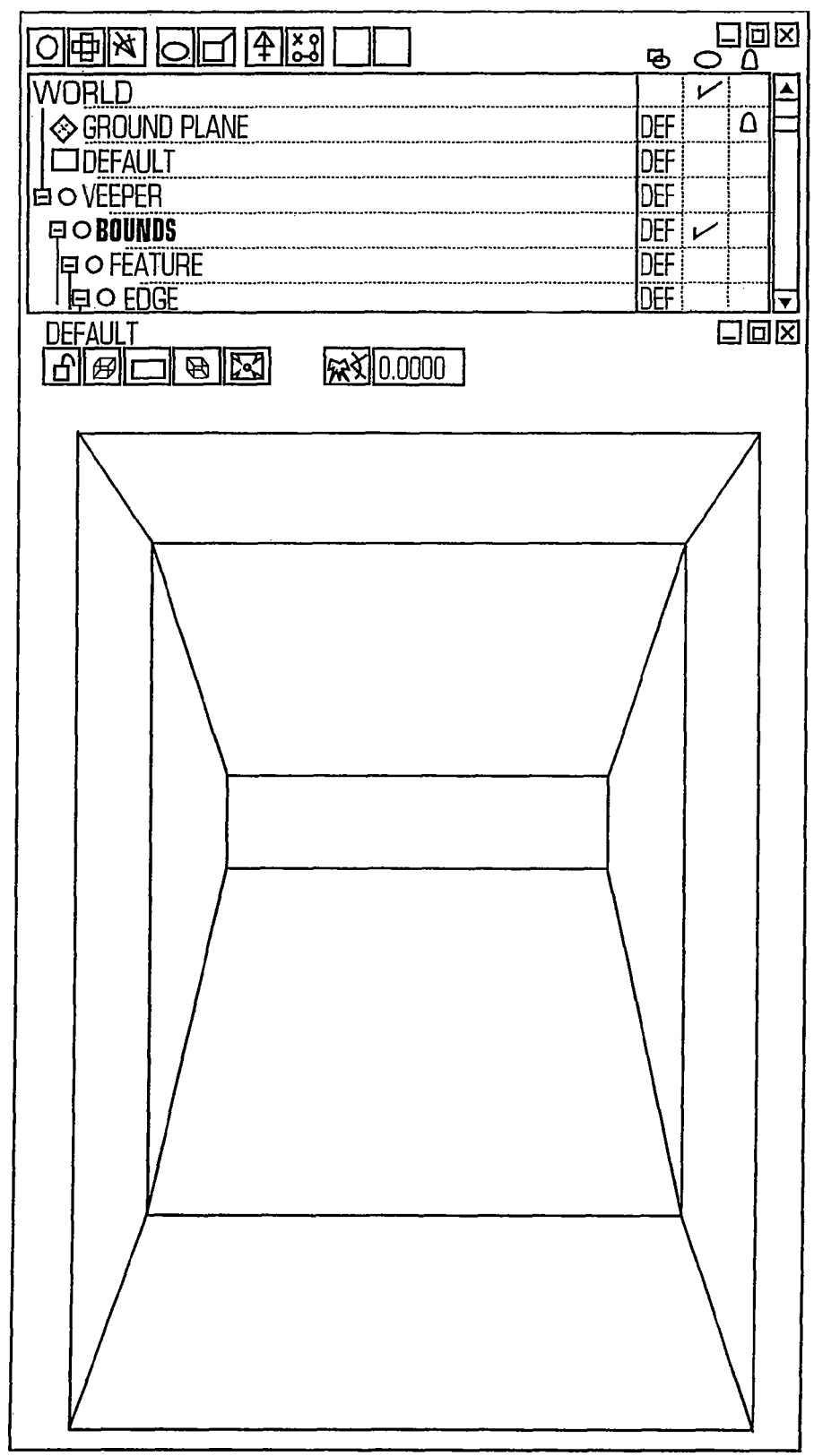
FIGS. 10A-10D illustrate respective deformation grids that can be used to generate a 3D model of a human head.
Figure 10B:
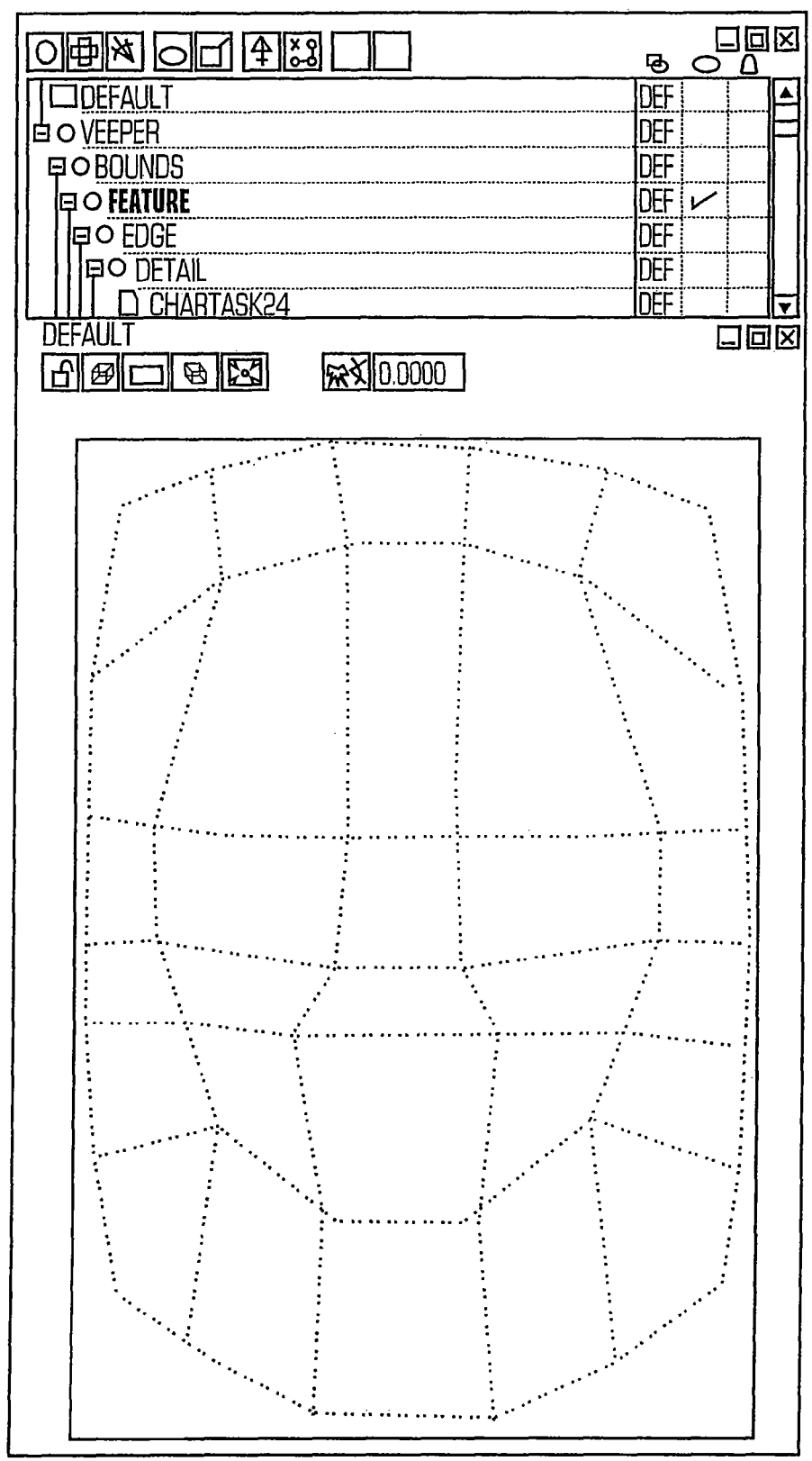
Figure 10C:
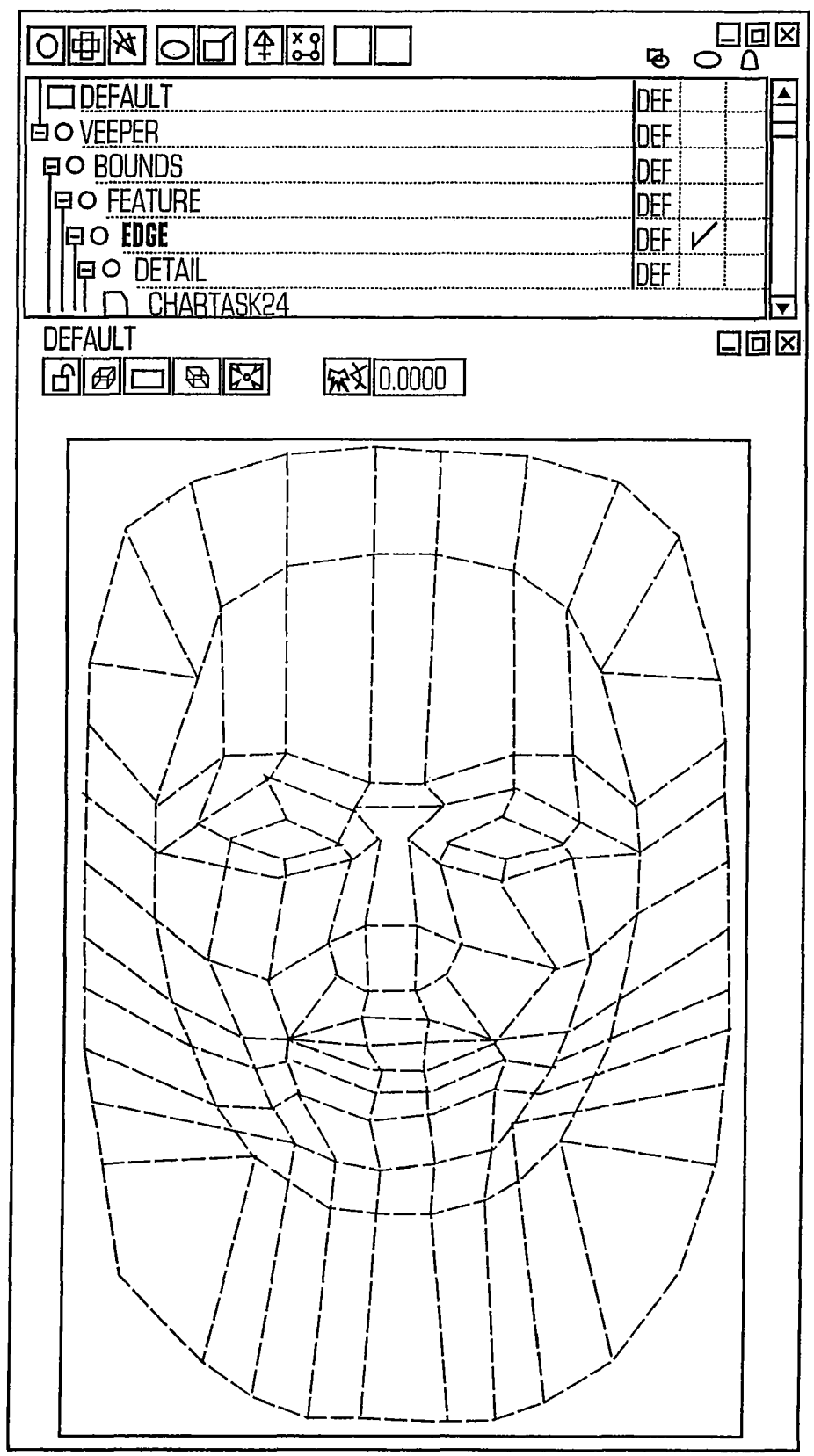
Figure 10D:
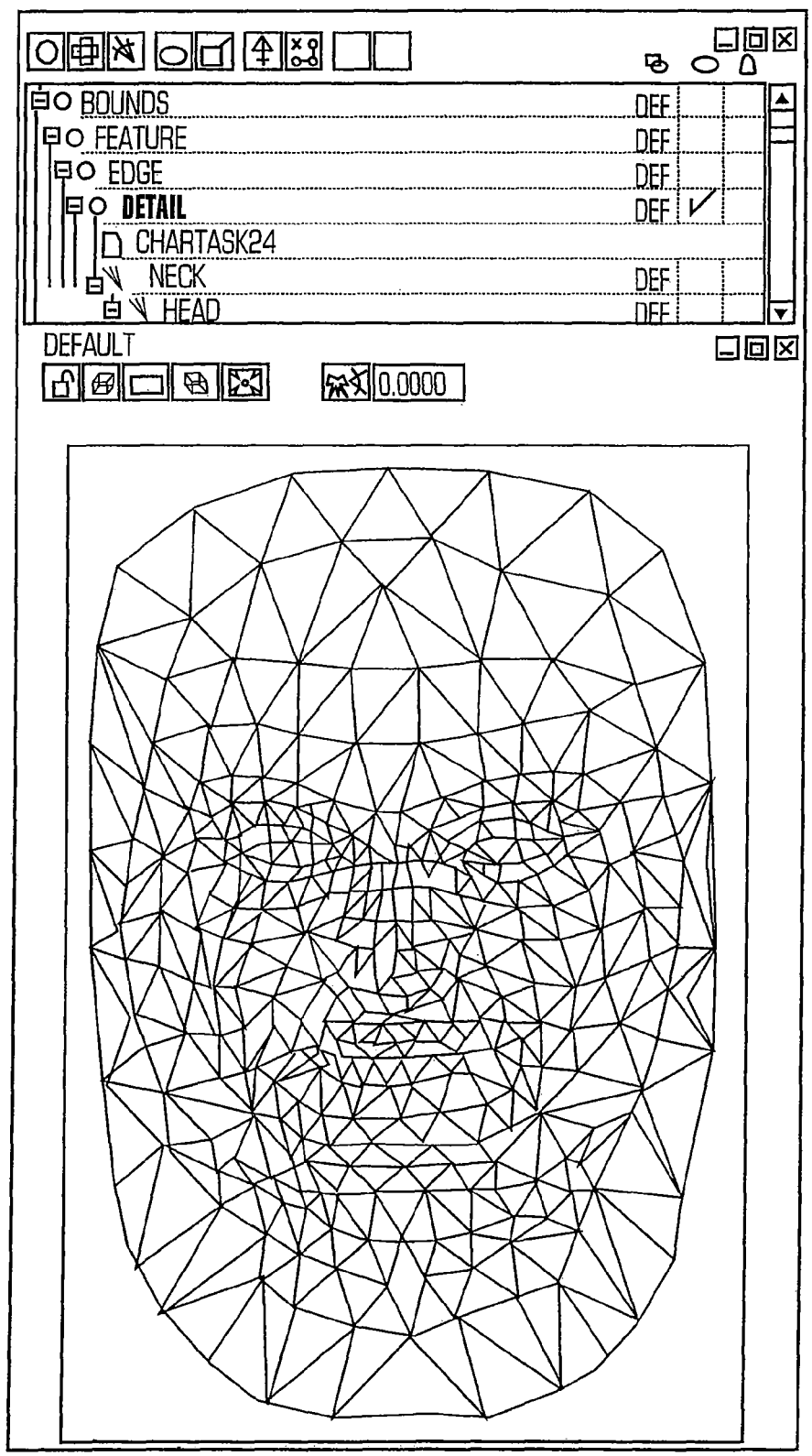
Figure 10E:
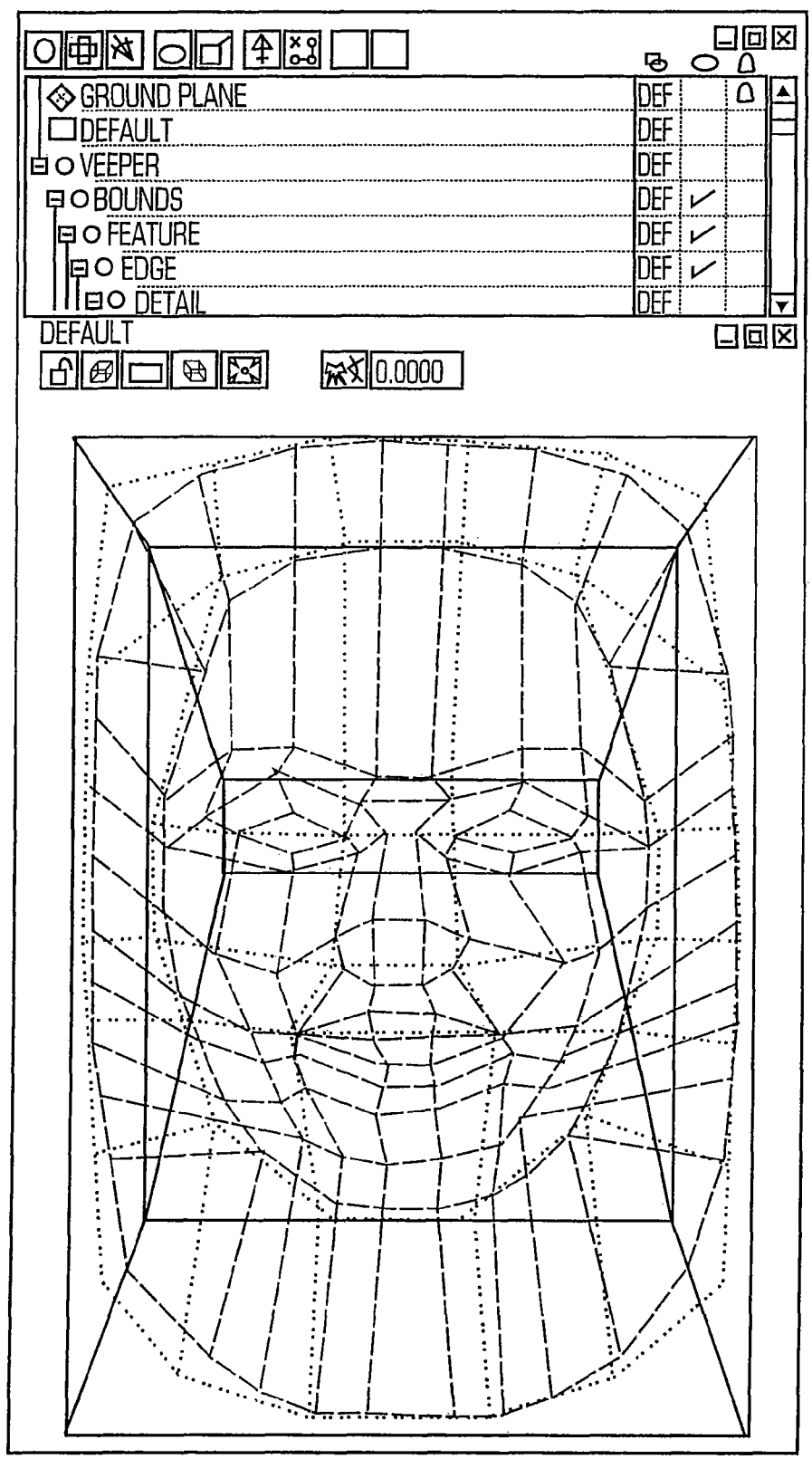
FIG. 10E illustrates the deformation grids overlaid upon one another.

FIGS. 1A-10D illustrate exemplary deformation grids that may be used to define a 3D model 70 of a human head. FIG. 10A illustrates a bounds space deformation grid 72 which is the innermost deformation grid. Overlaying the bounds space deformation grid 72 is a feature space deformation grid 74 (shown in FIG. 10B). An edge space deformation grid 76 (show in FIG. 10C) overlays the feature space deformation grid 74. FIG. 10D illustrates a detail deformation grid 7D that is the outermost deformation grid.

The grids are aligned in accordance with the landmark locations 10 (shown in FIG. 10E) such that the head image 30 will be appropriately aligned with the deformation grids when its landmark locations 10 are aligned with the landmark locations 10 of the deformation grids. To properly align the head image 30 with the deformation grids, a user may manually refine the landmark location precision on the head image (Step 8), for example by using the mouse or other input device to "drag" a particular landmark to a different area on the image 30. Using the new landmark location information, the image 30 may be modified with respect to the deformation grids as appropriate (Step 9) in order to properly align the head image 30 with the deformation grids. A new model state can then be calculated, the detail grid 78 can then be detached (Step 10), behaviors can be scaled for the resulting 3D model (Step 11), and the model can be saved (Step 12) for use as a virtual personality. Now, the automatic gesture generation in accordance with the invention will be described in more detail.

Figure 11:
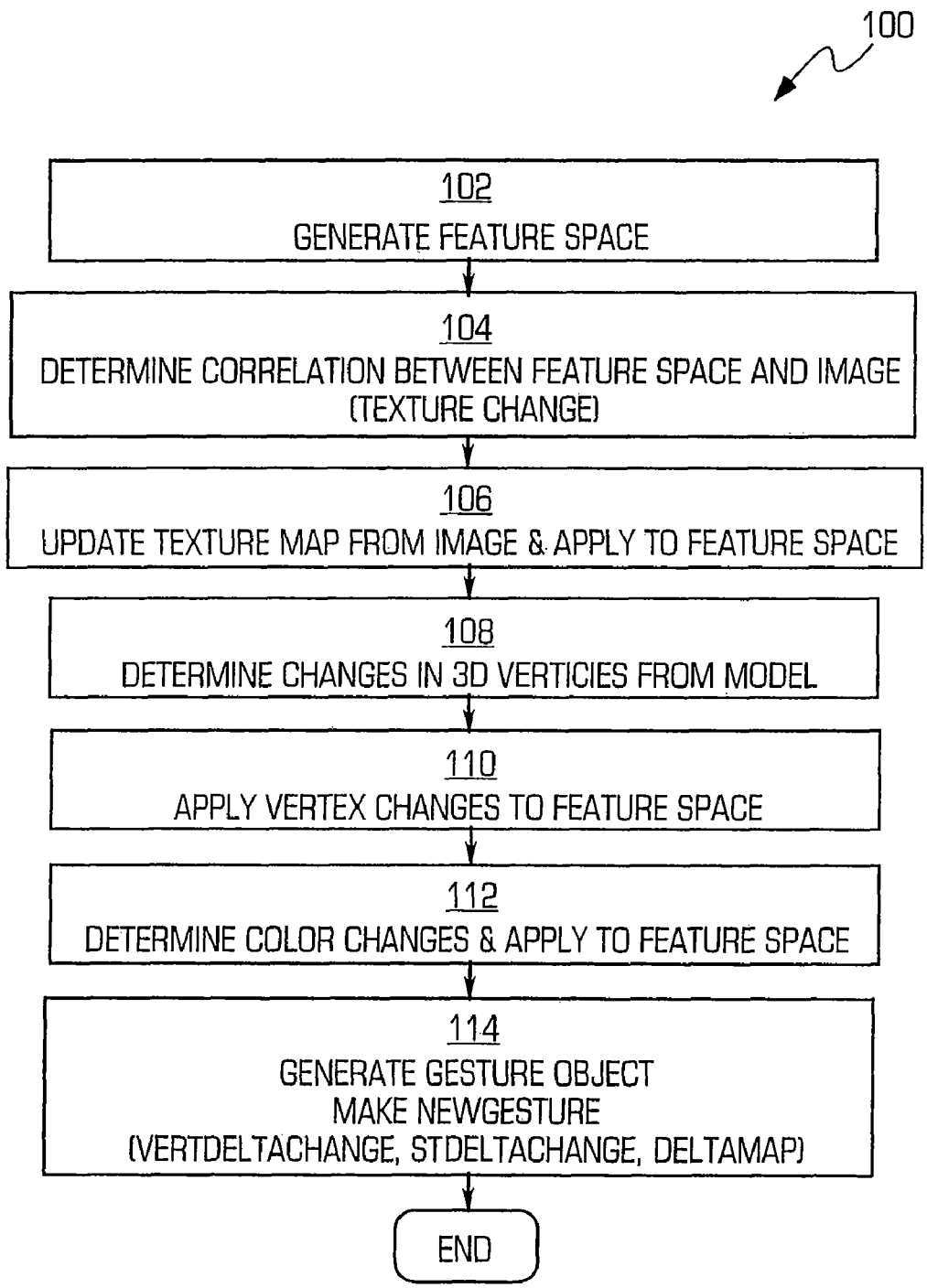
FIG. 11 is a flowchart illustrating the automatic gesture behavior generation method in accordance with the invention.

FIG. 11 is a flowchart illustrating an automatic gesture generation method 100 in accordance with the invention. In general, the automatic gesture generation results in a gesture object which may then be applied to any 3D model so that a gesture behavior may be rapidly generated and reused with other models. Usually, there may need to be a separate gesture model for different types of 3D models. For example, a smile gesture may need to be automatically generated for a human male, a human female, a human male child and a human female child in order to make the gesture more realistic. The method begins is step 102 in which a common feature space is generated. The feature space is common space that is used to store and represent an object image, such as a face, movements of the object during a gesture and object scalars which capture the differences between different objects. The gesture object to be generated using this method also stores a scalar field variable that stores the mapping between a model space and the feature space that permits transformation of motion and geometry data. The automatic gesture generation method involves using a particular image of an object, such as a face, to generate an abstraction of a gesture of the object, such as a smile, which is then stored as a gesture object so that the gesture object may then be applied to any 3D model.

Returning to FIG. 11, in step 104, the method determines the correlation between the feature space and the image space to determine the texture map changes which represent changes to the surface movements of the image during the gesture. In step 106, the method updates the texture map from the image (to check the correlation) and applies the resultant texture map to the feature space and generates a variable "stDeltaChange" as shown in the exemplary pseudo-code shown in FIGS. 14A and 14B which stores the texture map changes. In step 108, the method determines the changes in the 3D vertices of the image model during the gesture which captures the 3D movement that occurs during the gesture. In step 110, the vertex changes are applied to the feature space and are captured in the gesture object in a variable "VertDeltaChange" as shown in FIGS. 14A and 14B. In step 112, the method determines the texture coloration that occurs during the gesture and applies it to the feature space. The texture coloration is captured in the "DeltaMap" variable in the gesture object. In step 114, the gesture object is generated that includes the "stDeltaChange", "VertDeltaChange" and "DeltaMap" variables which contain the coloration, 2D and 3D movement that occurs during the gesture. The variables represent only the movement and color changes that occurs during a gesture so that the gesture object may then be applied to any 3D model. In essence, the gesture object distills the gesture that exists in a particular image model into an abstract object that contains the essential elements of the gesture so that the gesture may then be applied to any 3D model.

The gesture object also includes a scalar field variable storing the mapping between a feature space of the gesture and a model space of a model to permit transformation of the geometry and motion data. The scalarArray has an entry for each geometry vertex in the Gesture object. Each entry is a 3 dimensional vector that holds the change in scale for that vertex of the Feature level from its undeformed state to the deformed state. The scale is computed by vertex in Feature space by evaluating the scalar change in distance from that vertex to connected vertices. The scalar for a given Gesture vertex is computed by weighted interpolation of that Vertex's position when mapped to UV space of a polygon in the Feature Level. The shape and size of polygons in the feature level are chosen to match areas of similarly scaled movement. This was determined by analyzing visual flow of typical facial gestures. The above method is shown in greater detail in the pseudo-code shown in FIGS. 14A and 14B.

FIGS. 12A-B and FIGS. 13A and B, respectively, contain a sample pseudo code algorithm and exemplary workflow process for automatically generating a 3D model in accordance with the invention.

The automatically generated model can incorporate built-in behavior animation and interactivity. For example, for the human face, such expressions include gestures, mouth positions for lip syncing (visemes), and head movements. Such behaviors can be integrated with technologies such as automatic lip syncing, text-to-speech, natural language processing, and speech recognition and can trigger or be triggered by user or data driven events. For example, real-time lip syncing of automatically generated models may be associated with audio tracks. In addition, real-time analysis of the audio spoken by an intelligent agent can be provided and synchronized head and facial gestures initiated to provide automatic, life-like movements to accompany speech delivery.

Thus, virtual personas can be deployed to serve as an intelligent agent that may be used as an interactive, responsive front-end to information contained within knowledge bases, customer resource management systems, and learning management systems, as well as entertainment applications and communications via chat, instant messaging, and e-mail. Now, examples of a gesture being generated from an image of a 3D model and then applied to another model in accordance with the invention will now described.

Figure 15:
FIG. 15 illustrates an example of a base 3D model for a first model, Kristen.
Figure 16:
FIG. 16 illustrates an example of a base 3D model for a second model, Ellie.
Figure 17:
FIG. 17 is an example of the first model in a neutral gesture.
Figure 18:
FIG. 18 is an example of the first model in a smile gesture.
Figure 19:
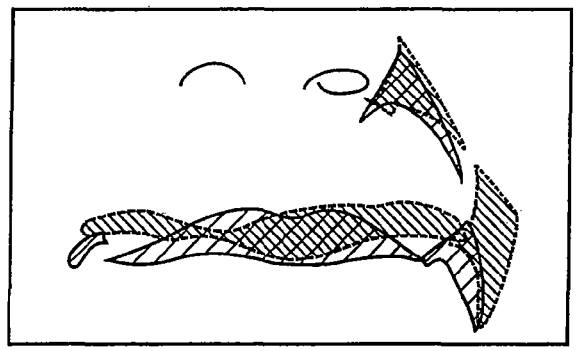
FIG. 19 is an example of a smile gesture map generated from the neutral gesture and the smile gesture of the first model.

FIG. 15 illustrates an example of a base 3D model for a first model, Kristen. The 3D model shown in FIG. 15 has been previously generated as described above using the 3D model generation process. FIG. 16 illustrates a second 3D model generated as described above. These two models will be used to illustrate the automatic generation of a smile gesture from an existing model to generate a gesture object and then the application of that generated gesture object to another 3D model. FIG. 17 show an example of the first model in a neutral gesture while FIG. 18 shows an example of the first model in a smile gesture. The smile gesture of the first model is then captured as described above. FIG. 19 illustrates an example of the smile gesture map (the graphical version of the gesture object described above) that is generated from the first model based on the neutral gesture and the smile gesture. As described above, the gesture map abstracts the gesture behavior of the first model into a series of coloration changes, texture map changes and 3D vertices changes which can then be applied to any other 3D model that has texture maps and 3D vertices. Then, using this gesture map (which includes the variables described above), the gesture object may be applied to another model in accordance with the invention. In this manner, the automatic gesture generation process permits various gestures for a 3D model to be abstracted and then applied to other 3D models.

Figure 20:
FIG. 20 is an example of the feature space with both the models overlaid over each other.
Figure 21:
FIG. 21 is an example of a neutral gesture for the second model.
Figure 22:
FIG. 22 is an example of the smile gesture, generated from the first model, being applied to the second model to generate a smile gesture in the second model.

FIG. 20 is an example of the feature space with both the models overlaid over each other to illustrate that the feature space of the first and second models are consistent with each other. Now, the application of the gesture map (and therefore the gesture object) to another model will be described in more detail. In particular, FIG. 21 illustrates the neutral gesture of the second model. FIG. 22 illustrates the smile gesture (from the gesture map generated by from the first model) applied to the second model to provide a smile gesture to that second model even when the second model does not actually show a smile.

While the above has been described with reference to a particular method for locating the landmark location points on the image and a particular method for generating gestures, those skilled in the art will recognize that other techniques may be used without departing from the invention as defined by the appended claims. For example, techniques such as pyramid transforms which uses a frequency analysis of the image by down sampling each level and analyzing the frequency differences at each level can be used. Additionally, other techniques such as side sampling and image pyramid techniques can be used to process the image. Furthermore, quadrature (low pass) filtering techniques may be used to increase the signal strength of the facial features, and fuzzy logic techniques may be used to identify the overall location of a face. The location of the landmarks may then be determined by a known corner finding algorithm.

The invention claimed is:

1. A method comprising:
   determining a two dimensional variable indicating a first change of a surface of a first object represented in an image, the first change occurring during a movement of the first object;
   determining a three dimensional variable indicating a second change of a vertex associated with the first object, the second change occurring during the movement of the first object;
   generating, by a processor, a model comprising the two dimensional variable and the three dimensional variable; and
   applying the model to a second object to animate the second object.

2. The method of claim 1, further comprising:
   determining a scalar field variable representing a mapping between a feature space of the movement and a model space to enable transformation of the vertex.

3. The method of claim 1, wherein the model further comprises a third variable indicating a third change in a coloration occurring during the movement of the first object.

4. The method of claim 1, wherein the scalar field variable comprises an array having respective entries for a plurality of vertices, the entries comprising respective three-dimensional vectors configured to store data representing changes in scale of the plurality of vertices in the feature space between an undeformed state and a deformed state.

5. The method of claim 3, wherein the scalar field variable is based on a weighted interpolation of respective positions of the vertex mapped to a second space associated with a polygon in the feature space.

6. The method of claim 3, further comprising:
   generating the model, wherein generating the model includes generating the feature space and mapping the movement between the feature space and the model space.

7. A non-transitory computer readable medium having computer instructions stored thereon, the instructions comprising:
   instructions for determining a two dimensional variable indicating a first change of a surface of a first object represented in an image, the first change occurring during a movement of the first object;
   instructions for determining a three dimensional variable indicating a second change of a vertex associated with the first object, the second change occurring during the movement of the first object;
   instructions for generating a model comprising the two dimensional variable and the three dimensional variable; and
   instructions for applying the model to a second object to animate the second object.

8. The non-transitory computer readable medium of claim 6, further comprising:
   instructions for determining a scalar field variable representing a mapping between a feature space of the movement and a model space to enable transformation of the vertex.

9. The non-transitory computer readable medium of claim 7, wherein the model further comprises a third variable indicating a third change in a coloration occurring during the movement of the first object.

10. The non-transitory computer readable medium of claim 7, wherein the scalar field variable comprises an array having respective entries for a plurality of vertices, the entries comprising respective three-dimensional vectors configured to store data representing changes in scale of the plurality of vertices in the feature space between an undeformed state and a deformed state.

11. The non-transitory computer readable medium of claim 9, wherein the scalar field variable is based on a weighted interpolation of respective positions of the vertex mapped to a second space associated with a polygon in the feature space.

12. The non-transitory computer readable medium of claim 9, further comprising:
   instructions for generating the model, wherein generating the model includes generating the feature space and mapping the movement between the feature space and the model space.

13. An apparatus comprising:
   means for determining a two dimensional variable indicating a first change of a surface of a first object represented in an image, the first change occurring during a movement of the first object;
   means for determining a three dimensional variable indicating a second change of a vertex associated with the first object, the second change occurring during the movement of the first object;
   means for generating a model comprising the two dimensional variable and the three dimensional variable; and
   means for applying the model a second object to animate the second object.

14. The apparatus of claim 13, further comprising:
   means for determining a scalar field variable representing a mapping between a feature space of the movement and a model space to enable transformation of the vertex.

15. The apparatus of claim 13, wherein the model further comprises a third variable indicating a third change in a coloration occurring during the movement of the first object.

16. The apparatus of claim 13, wherein the scalar field variable comprises an array having respective entries for a plurality of vertices, the entries comprising respective three-dimensional vectors configured to store data representing changes in scale of the plurality of vertices in the feature space between an undeformed state and a deformed state.

17. The apparatus of claim 15, wherein the scalar field variable is based on a weighted interpolation of respective positions of the vertex mapped to a second space associated with a polygon in the feature space.

18. The apparatus of claim 15, further comprising:

means for generating the model, wherein generating the model includes generating the feature space and mapping the movement between the feature space and the model space.

* * * * *

UNITED STATES PATENT AND TRADEMARK OFFICE
CERTIFICATE OF CORRECTION

| | | |
|---|---|---|
| PATENT NO. | : 8,289,317 B2 | Page 1 of 2 |
| APPLICATION NO. | : 13/313564 | |
| DATED | : October 16, 2012 | |
| INVENTOR(S) | : Harvill | |

It is certified that error appears in the above-identified patent and that said Letters Patent is hereby corrected as shown below:

On Title Page 2, Item (56), under "OTHER PUBLICATIONS", in Column 1, Line 1, delete "Radia" and insert -- Radial --, therefor.

On Title Page 2, Item (56), under "OTHER PUBLICATIONS", in Column 1, Line 2, delete "Oct. 2000" and insert -- Oct. 2000, --, therefor.

On Title Page 2, Item (56), under "OTHER PUBLICATIONS", in Column 1, Line 5, delete "Jul. 1999" and insert -- Jul. 1999, --, therefor.

On Title Page 2, Item (56), under "OTHER PUBLICATIONS", in Column 1, Line 8, delete "Nov. 1995" and insert -- Nov. 1995, --, therefor.

On Title Page 2, Item (56), under "OTHER PUBLICATIONS", in Column 1, Line 14, delete "generalion" and insert -- generation --, therefor.

On Title Page 2, Item (56), under "OTHER PUBLICATIONS", in Column 2, Line 8, delete "visualISOIIEC" and insert -- visual/ISO/IEC --, therefor.

On Title Page 2, Item (56), under "OTHER PUBLICATIONS", in Column 2, Line 9, delete "ISOIIEC JTC1/SC29IWG11" and insert -- ISO/IEC JTC1/SC29/WG11 --, therefor.

On Title Page 2, Item (56), under "OTHER PUBLICATIONS", in Column 2, Line 11, delete "L1AM" and insert -- Liam --, therefor.

On Title Page 2, Item (56), under "OTHER PUBLICATIONS", in Column 2, Line 13, delete "ISOIIEC JTC1/SC29IWG11" and insert -- ISO/IEC JTC1/SC29/WG11 --, therefor.

Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,289,317 B2

On Title Page 2, Item (56), under "OTHER PUBLICATIONS", in Column 2, Lines 19-20, delete ""AudioNideo and synthetic graphicslaudio for mixed media" Signal Processing." and insert -- "Audio/Video and synthetic graphics/audio for mixed media" Signal Processing, --, therefor.

On Title Page 2, Item (56), under "OTHER PUBLICATIONS", in Column 2, Line 24, delete "[MPEG-4" and insert -- MPEG-4 --, therefor.

On Title Page 2, Item (56), under "OTHER PUBLICATIONS", in Column 2, Line 26, delete "ISOIIEC JTC11SC," and insert -- ISO/IEC JTC1/SC, --, therefor.

On Title Page 2, Item (56), under "OTHER PUBLICATIONS", in Column 2, Line 27, delete "Constructionof" and insert -- Construction of --, therefor.

In the Drawings

In Fig. 11, Sheet 12 of 25, in Box "108", in Line 1, delete "VERTICIES" and insert -- VERTICES --, therefor.

In the Specifications

In Column 6, Line 59, delete "FIGS. 1A-10D" and insert -- FIGS. 10A-10D --, therefor.

In Column 8, Line 55, delete "show" and insert -- shows --, therefor.